Inventor:
Martin Neidhart
by Sommers + Young
Attorneys

May 21, 1940.    M. NEIDHART    2,201,317
TEDDER FOR SPREADING CUT GRASS AND THE LIKE
Filed Oct. 11, 1938    2 Sheets-Sheet 2

Inventor:
Martin Neidhart
by Sommers + Young
Attorneys

Patented May 21, 1940

2,201,317

UNITED STATES PATENT OFFICE 2,201,317

TEDDER FOR SPREADING CUT GRASS AND THE LIKE

Martin Neidhart, Bonstetten, Switzerland

Application October 11, 1938, Serial No. 234,436
In Switzerland October 12, 1937

4 Claims. (Cl. 56—372)

This invention relates to tedders for spreading out grass and the like.

In machines for tedding cut grass and the like, it is known to reciprocate circulating fork supports simultaneously about their own axes. Such constructions, however, are complicated and offer abundant opportunity for the material picked up by the forks to catch in the moving parts serving to actuate the fork supports and thereby destroy the effectiveness of the arrangement. Furthermore, in the known arrangements, the oscillatory movement described, in addition to the rotary or circulatory movement, of the fork supports exerts but slight influence on the spreading or distributing operation.

In the machine for spreading cut grass and the like according to the present invention, fork supports are mounted on a rotating part, and are also adapted to swing on bearing pins which extend transversely to the axis of the rotating part and are connected with a lever mechanism cooperating with a stationary eccentric through which the fork supports and forks can be reciprocated laterally in the direction of the axle while performing the circulatory motion. Furthermore, according to the invention, means is provided for disconnecting the fork operating means from the source of driving power when desired.

Thus, by simple means, during operation of the machine, the fork supports, while performing the circulatory movement, can also be rocked to and fro reciprocally transversely, that is, in the direction of the axis, with uniform speed, in order continuously to loosen and shake up the material and then throw off the loosened material. As compared with previously-known arrangements, the spreading is more efficient and uniform, even with long grass, and without danger of the material being caught in the apparatus.

An embodiment of the invention is illustrated, by way of example only, in the accompanying drawings in which Fig. 1 represents a sectional elevation on the line I—I of Fig. 2 of a tedder according to the invention;

Figure 1:
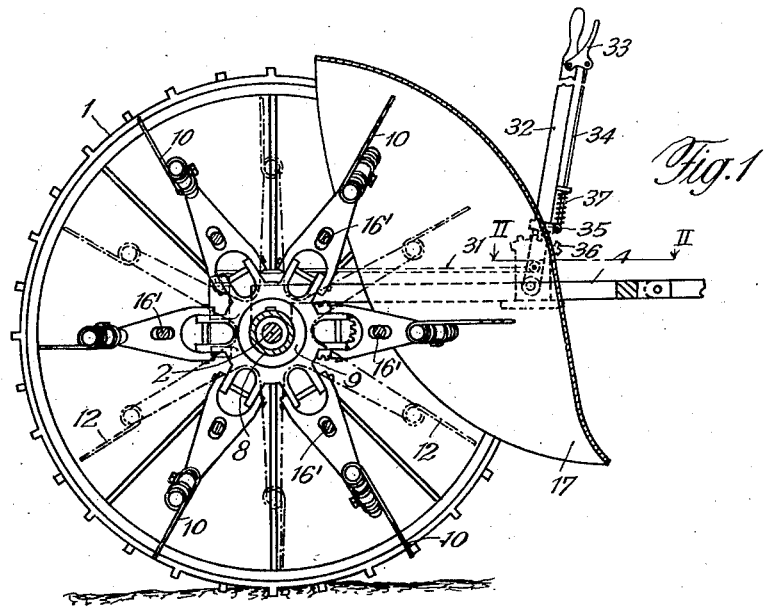

The numeral 1 designates the road wheels of the machine whereas 2 refers to the road wheel axle. On the hubs of the road wheels 1 are provided screws 21 which project into annular grooves 22 in the road wheel axle 2 by which means the road wheels 1 are secured on the road wheel axle against shifting in the axial direction. In the hub of each road wheel 1 a ratchet mechanism is included which is provided with two pawls 24 loaded by springs 23 and adapted to cooperate with a ratchet wheel 25 keyed to the road wheel axle 2.

During the forward movement of the machine the road wheel axle 2 is turned in unison with the road wheels 1 due to cooperation of the pawls 24 with the ratchet wheels 25, whereas during the rearward movement of the machine the pawls 24 are ineffective, so that the road wheel axle 2 is thus not turned. On the road wheel axle 2 a guide member 26 is keyed on which is displaceably arranged, by means of grooves, a clutch control collar 27 into the circumferential groove of which engages a fork 28 which is connected by means of a bolt 29, mounted on the carrier frame 4 in a bearing socket 4' of the latter, with an arm 30. This arm is connected by means of an adjusting rod 31 with a hand control lever 32 (Fig. 1) mounted on the carrier frame 4.

On the hand control lever 32 a handle 33 is rockably mounted which is connected by means of a connecting rod 34 with a locking pawl 35 pivotally arranged on the hand control lever 32. This pawl is adapted to cooperate with a toothed sector 36 secured on the carrier frame 4, for the purpose of locking the hand control lever 32 in its various positions of adjustment. By retracting the locking pawl 35, by means of the handle 33 against the influence of a compression spring 37, the hand control lever 32 is released for being adjusted. By appropriately rocking the hand control lever 32, the clutch control collar 27 can be connected with or disconnected from the hub of a disked wheel 3, by means of the adjusting rod 31 and the fork 28, the disked wheel being loosely mounted on the road wheel axle 2.

When the clutch control collar 27 is connected, the rotational movement of the road wheel axle 2 is transmitted to the disked wheel 3 which in turn rotates a gear wheel 5 which is mounted by means of its shaft 5' in a bearing 38 arranged on the carrier frame 4. The gear wheel 5 transmits rotational movement to a gear wheel 6, which is also fixed on the shaft 5' and cooperates with a pinion 7, by which means a hollow shaft 8 is rotated which is pushed on the road wheel axle 2 and connected with said pinion. Together with the hollow shaft 8 are rotated supports 9 and 11 carrying tine forks 10 and 12 respectively and forming wheel spiders each arm of which carries a tine fork 10 or 12.

The second end of the hollow shaft 8 is provided with a support 15 which is keyed to its shaft and carries bell-crank levers 14, the one ends of which engage with a ring 13. This ring 13 is mounted on an eccentric 39 which is secured to the carrier frame 4 by means of a sleeve 40 keyed to the road wheel axle 2.

Figure 2:
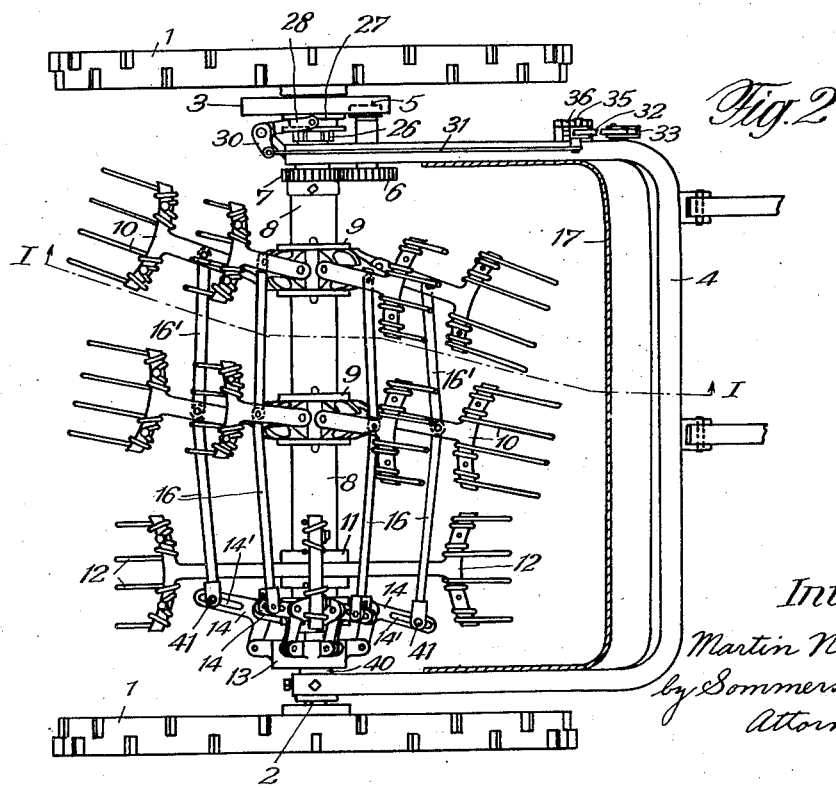
Fig. 2 is a top plan view of Fig. 1, partly in section.
Figure 3:
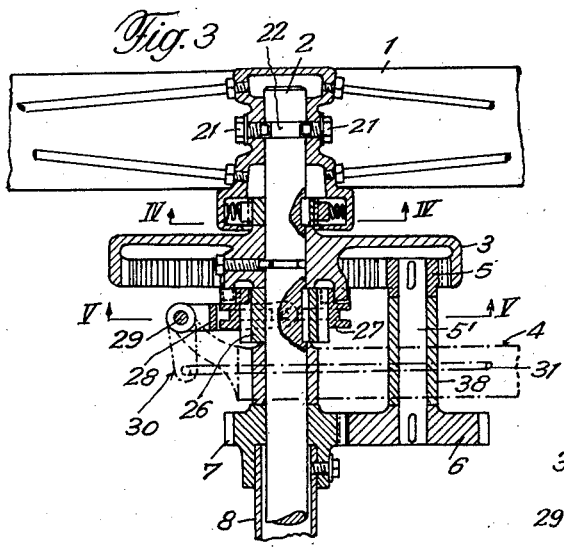
Fig. 3 is an axial section of one of the end portions of the road wheel axle on a larger scale.
Figure 4:
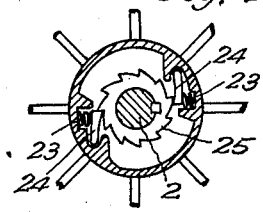
Fig. 4 is a cross section on the line IV—IV in Fig. 3.
Figure 5:
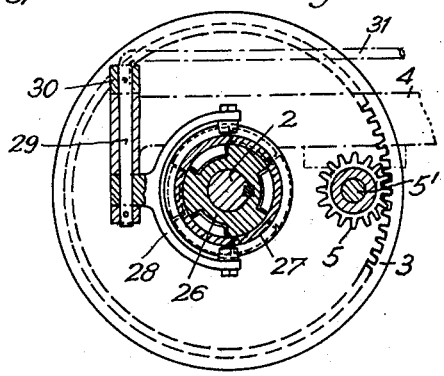
Fig. 5 is a cross section on the line V—V of Fig. 3.
Figure 6:
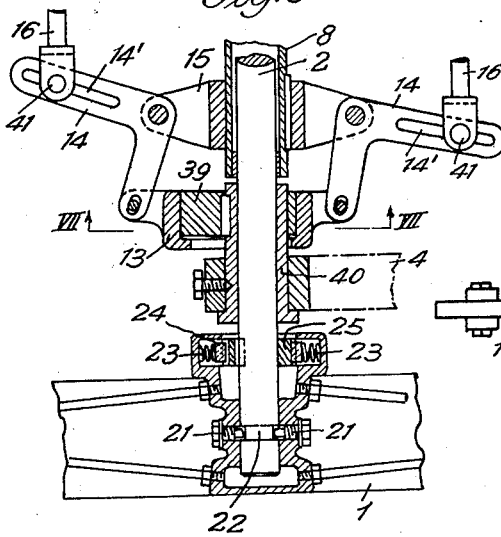
Fig. 6 is an axial section of the second end portion of the road wheel axle.
Figure 7:
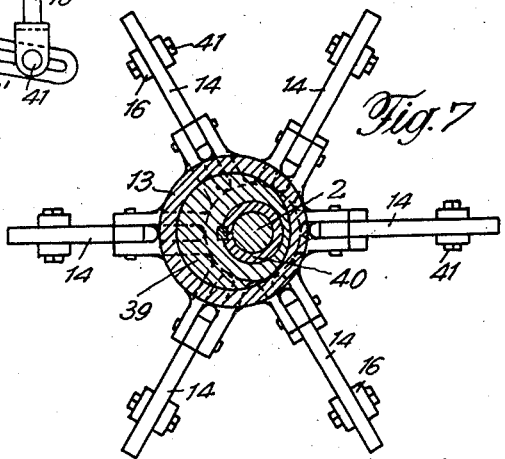
Fig. 7 is a cross section on the line VII—VII in Fig. 6.

Each of the second arms of the bell-crank levers 14 is connected by means of a screw with a control rod 16 which is connected in turn with one of the tine forks 10 which is coupled with a second tine fork 10 by a second control rod 16' (Fig. 2).

As the hollow shaft 8 rotates, the supports 9, 11 and 15 are turned in unison therewith so that the tine forks 10, 12 and the bell-crank levers 14 are moved along, while the ring 13 turns relative to the eccentric 39, whereby the bell-crank levers 14 swing back and forth. During these movements the tine forks 10 are uniformly rocked to and fro in the direction transverse to their circulating movement by the bell-crank levers 14 by means of the control rods 16, 16' so that the tine forks swing out correspondingly in the lateral direction. Each two tine forks 10 that adjoin each other on the respective sides of the road wheel axle 2 and are interconnected by control rods 16, 16' are inclined at different angles, so that their paths of circulation are not parallel. The tine forks 12 fixed to the support 11 move through a planar circulation path during the rotation of the hollow shaft 8.

The range of side whip of the tine forks 10 can be varied by accordingly adjusting the screws 41 on the control rods 16 in slots 14' of the bell-crank levers 14 by which means the effective length of the respective arms of the bell-crank levers 14 is varied. The range of side whip of each pair of tine forks 10, which are interconnected by a linkage 16, 16' can be separately adjusted, so that the range of side whip of each pair of tine forks 10 may be varied independently of the other pairs.

The circulation tine forks 10 and 12 pick up the material to be spread, convey it upwardly in the front part of the hood 17 connected to the carrier frame 4, separate it and fling it on the ground in various directions.

Various changes and modifications may be made in the practice of my invention without departing from the principle or spirit thereof, by adding customary practice and established knowledge of the art to the present disclosure and the scope of the appended claims is not to be regarded as limited except as specified therein.

I claim:

1. In a machine for spreading cut grass and like materials, circulatory tine forks for spreading the material, a rotary support connected with said tine forks for rotating them together therewith, pivotal connections arranged between said support and said tine forks, said connections having their axes extending transversely to the axis of the support so as to adapt said forks to swing transversely to said circulatory movement thereof, a drive for rotating said support in accordance with the run of the machine, a disconnectible coupling for transmitting said rotation intercalated between said drive and said support, an eccentric stationarily mounted relative to said support, and crank-lever means operatively connected with said tine forks and said eccentric for imparting said swinging movement to said circulating forks, as said coupling is connected, when said machine is running.

2. In a machine for spreading cut grass and like materials, circulatory tine forks for spreading the material, a rotary support connected with said tine forks for rotating them together therewith, pivotal connections arranged between said support and said tine forks, said connections having their axes extending transversely to the axis of the support so as to adapt said forks to swing transversely to said circulatory movement thereof, a drive for rotating said support in accordance with the run of the machine, a disconnectible coupling for transmitting said rotation intercalated between said drive and said support, an eccentric stationarily mounted relative to said support, crank-lever means operatively connected with said tine forks and said eccentric, and an adjustable control lever arm included in said crank-lever means for varying the range of the swinging movement imparted to said circulating forks by said crank-lever means when the machine is running and the coupling is connected.

3. In a machine for spreading cut grass and like materials, groups of circulatory tine forks for spreading the material, a rotary support connected with said groups of tine forks spaced apart transversely to the circulating movement of said tine forks by rotation of said support, pivotal connections arranged between said support and said tine forks, said connections having their axes extending transversely to the axis of the support so as to adapt said forks to swing transversely to said circulatory movement thereof, a drive for rotating said support in accordance with the run of the machine, a disconnectible coupling for transmitting said rotation intercalated between said drive and said support, an eccentric stationarily mounted relative to said support, crank-lever means operatively connected with said tine forks and said eccentric, driving links included in said crank-lever means extending between adjacent tine forks in said groups on corresponding sides of said support, said links being of lengths differing from the distances between the axes of the pivotal connections of the respective tine forks for sustaining said adjacent forks at different angles to said support and transmitting said swinging movement to said circulating forks when the machine is running and said coupling is connected.

4. In a machine for spreading cut grass and like materials, circulatory tine forks for spreading the material, a rotary support connected with said tine forks for rotating them together therewith, pivotal connections arranged between said support and certain of said tine forks, said connections having their axes extending transversely to the axis of the support so as to adapt said pivotally connected forks to swing transversely to said circulatory movement thereof while the remaining tine forks are fixed to said support for circulating about said support without performing transverse swinging movements, a drive for rotating said support in accordance with the run of the machine, a disconnectible coupling for transmitting said rotation intercalated between said drive and said support, an eccentric stationarily mounted relative to said support, and crank-lever means operatively connected with said tine forks and said eccentric for imparting said swinging movement to said circulating forks when the machine is running and the coupling is connected.

MARTIN NEIDHART.